(12) United States Patent
Imam et al.

(10) Patent No.: US 12,399,971 B2
(45) Date of Patent: Aug. 26, 2025

(54) SYSTEM AND METHOD FOR CLASSIFYING HUMAN AND NON-HUMAN TRAFFIC USING BEHAVIOR AUTHENTICITY

(71) Applicant: RADWARE LTD., Tel Aviv (IL)

(72) Inventors: Zaid Imam, Bengaluru (IN); Rakesh Thatha, Bengaluru (IN); Pavan Thatha, Bengaluru (IN)

(73) Assignee: Radware Ltd., Tel Aviv (IL)

( * ) Notice: Subject to any disclaimer, the term of this patent is extended or adjusted under 35 U.S.C. 154(b) by 298 days.

(21) Appl. No.: 17/811,340

(22) Filed: Jul. 8, 2022

(65) Prior Publication Data

US 2024/0012896 A1    Jan. 11, 2024

(51) Int. Cl.
*G06F 21/36* (2013.01)

(52) U.S. Cl.
CPC ...... *G06F 21/36* (2013.01); *G06F 2221/2103* (2013.01); *G06F 2221/2133* (2013.01)

(58) Field of Classification Search
CPC ...................................................... G06F 21/36
See application file for complete search history.

(56) References Cited

U.S. PATENT DOCUMENTS

| | | | |
|---|---|---|---|
| 8,352,598 B2 | 1/2013 | Nyang et al. | |
| 8,483,518 B2 | 7/2013 | Zhu et al. | |
| 8,671,058 B1 | 3/2014 | Isaacs | |
| 9,213,821 B2 | 12/2015 | Saxena et al. | |
| 9,317,676 B2 | 4/2016 | Liu et al. | |
| 9,495,532 B1 | 11/2016 | Zhurkin | |
| 9,942,214 B1 | 4/2018 | Burciu et al. | |
| 10,032,463 B1 | 7/2018 | Rastrow et al. | |
| 10,817,596 B2 | 10/2020 | Yeh et al. | |
| 10,885,167 B1 | 1/2021 | Lador et al. | |
| 10,949,523 B2 | 3/2021 | Agarwal et al. | |
| 11,086,981 B2 | 8/2021 | Shen et al. | |
| 2008/0127302 A1* | 5/2008 | Qvarfordt | G06F 21/36 726/2 |
| 2009/0328150 A1* | 12/2009 | Gross | A63F 13/338 340/407.1 |
| 2013/0346311 A1 | 12/2013 | Boding et al. | |
| 2015/0143495 A1* | 5/2015 | Okada | H04L 63/08 726/7 |
| 2016/0352764 A1 | 12/2016 | Mermoud et al. | |
| 2017/0316191 A1* | 11/2017 | Sipos | G06F 21/31 |
| 2019/0166141 A1 | 5/2019 | Xu et al. | |
| 2019/0228099 A1 | 7/2019 | Bajaj et al. | |
| 2020/0065212 A1 | 2/2020 | Chanda et al. | |
| 2020/0090246 A1 | 3/2020 | Goyal et al. | |
| 2020/0242451 A1 | 7/2020 | Cao | |

* cited by examiner

Primary Examiner — Bradley W Holder
(74) Attorney, Agent, or Firm — M&B IP Analysts, LLC

(57) ABSTRACT

The method and system for performing a completely automated public Turing test to tell computers and humans apart (CAPTCHA). The method comprises receiving by a server a request from a service server to initiate a CAPTCHA of a user node; generating an image of a path; generating at least one target to be placed upon the path; generating an object to be placed at a start point of the path; sending the generated path, the at least one generated target, and the object as a CAPTCHA challenge to the user node for display thereon; receiving, by the server, data respective of motion of the object with respect to the path and the at least one generated target; and issuing, based on analysis of the data received data, a pass indication upon determination that the user node is operative by a human.

20 Claims, 6 Drawing Sheets

SYSTEM AND METHOD FOR CLASSIFYING HUMAN AND NON-HUMAN TRAFFIC USING BEHAVIOR AUTHENTICITY

TECHNICAL FIELD

The disclosure generally relates to systems and methods of generation of image-based challenges, and more particularly challenges for Completely Automated Public Turing test to Tell Computers and Humans Apart (CAPTCHA) challenges.

BACKGROUND

Completely Automated Public Turing test to Tell Computers and Humans Apart (CAPTCHA) is used for verification that a human is behind an access attempt. Websites, computer programs, interactive devices, interactive applications, and like thereof, suffer from attempts for unauthorized use by other machines or applications, such as robots, also known shortly as bots. These bots attempt to imitate the steps necessary to gain access. In some cases, such access is undesirable, in other cases even destructive due to the malicious intentions of the access attempted.

CAPTCHA refers to a group of different solutions, all attempting to address the issue of verification that a human is attempting the access. CAPTCHA does not attempt to verify the user's intents, but the underlying assumption is that a human verified as such may gain access. The CAPTCHA should therefore provide access to humans and prevent access by machines. It is preferable that both false negative (FN), i.e., the case where access is denied from a real user, as well as false positive (FP), i.e., the case where access is provided to a machine, are as low as possible. On the other hand, it is also desirable that the human user experience (UX) shall be satisfactory.

The simplest form of CAPTCHA available is where the user needs to confirm that he or she is not a bot. To this end, the user clicks a checkbox, which is sufficient to confirm that a real user, rather than a machine or bot, is attempting access. Another level of CAPTCHA is providing some kind of a challenge, such as a series of characters, for example, from the alphabet, displayed before the user. The user needs to repeat the sequence of characters in a textbox. If the sequence is correct, then access may be gained. In some cases, the display of the characters is dynamic with shaking characters, lines crossing the characters, changing background, or changing color within the character itself. All are made to make it more difficult for machines to recognize the characters and attempt to respond as if a human has done so. The characters may be spoken instead of displayed to support visually impaired persons. Another simple form of CAPTCHA is a Press & Hold button that can also indicate a human interaction.

More sophisticated CAPTCHA solutions provide one or more pictures within a given frame. The user may be requested to select all the pictures, or portions thereof, that contain a particular object. For example, a picture of a cross-roads may be displayed with traffic lights at multiple locations. The pictures are typically divided into smaller sections, and the user is requested to select all those sections where the traffic lights are present. If the user selects correctly, then the user is identified as a human which may gain access. If not, another attempt may be allowed, or access may be blocked. Another solution is to provide a picture to select a specific item or items shown in the pictures.

In yet another example, a CAPTCHA may include illustrations of three-dimensional (3D) objects. The user is then expected to identify, from a plurality of possibilities, where such a 3D object will end once the object starts moving on a path. The more sophisticated kinds of CAPTCHA provide a challenge that the user must resolve. When the challenge is properly resolved, access is permitted. Otherwise, access is either denied or another attempt at a challenge is offered.

The CAPTCHA service has been evolving for quite a while with text CAPTCHA, comparison CAPTCHA, checkbox CAPTCHA, textbox CCAPTCHA and even attempts to a no CAPTCHA solution. CAPTCHA service providers are struggling to provide a good and human-friendly user experience.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for performing a completely automated public Turing test to tell computers and humans apart (CAPTCHA). The method includes receiving by a server a request from a service server to initiate a CAPTCHA of a user node; generating an image of a path; generating at least one target to be placed upon the path; generating an object to be placed at a start point of the path; sending the generated path, the at least one generated target, and the object as a CAPTCHA challenge to the user node for display thereon; receiving, by the server, data respective of motion of the object with respect to the path and the at least one generated target; and issuing, based on analysis of the data received data, a pass indication upon determination that the user node is operative by a human.

Certain embodiments disclosed herein include a system for performing a completely automated public Turing test to tell computers and humans apart (CAPTCHA), comprising: a processing circuitry; and a memory, the memory containing instructions that, when executed by the processing circuitry, configure the system for: receive by a server a request from a service server to initiate a CAPTCHA of a user node; generate an image of a path; generate at least one target to be placed upon the path; generate an object to be placed at a start point of the path; send the generated path, the at least one generated target, and the object as a CAPTCHA challenge to the user node for display thereon; receive, by the server, data respective of motion of the object with respect to the path and the at least one generated target; and issue, based on analysis of the data received data, a pass indication upon determination that the user node is operative by a human.

BRIEF DESCRIPTION OF THE DRAWINGS

The subject matter of the disclosure is particularly pointed out and distinctly claimed in the claims at the conclusion of the specification. The foregoing and other objects, features and advantages will become apparent and more readily appreciated from the following detailed description taken in conjunction with the accompanying drawings.

DETAILED DESCRIPTION

Figure 1A:
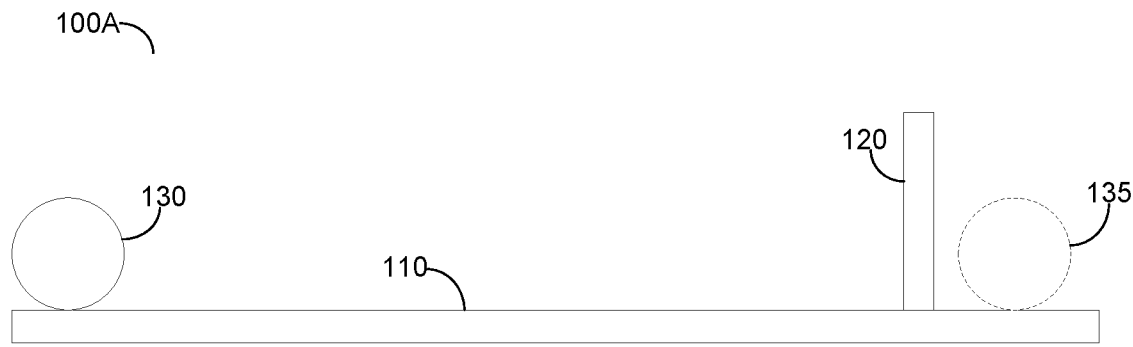
FIG. 1A is an illustration of a CAPTCHA at a starting position according to a first embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to some disclosed embodiments, a CAPTCHA server and methods thereof provide a user-friendly interface to determine whether a user is operating a user-node or rather, the user node is a bot-operated computer. In response to a request from a service server, the CAPTCHA server is configured to generate an image of a path that may comprise horizontal, vertical, curved, incline, and decline sections, which is sent to a user node. One or more targets are placed on the path and an object at the beginning of the path. The challenge for the user is to move the object over the path and passed each of the targets. The CAPTCHA server is further configured to receive data from the user node respective of the motion of the object with respect of the path and the targets. The CAPTCHA server is further configured to determine whether the passage over the path is deemed successful or not.

The disclosed embodiments ensure secured access to a protected entity (e.g., a web server), while reducing the time it takes to validate if a request to access such an entity is by a human (user) and not a bot. The generated CAPTCHA is intuitive to use, which does not leave a user guessing for characters or pictures to pass the challenge. As such, an improvement is achieved by the rate or number of false-negative attempts, i.e., valid access requests being denied.

FIG. 1A is an example illustration 100A of a CAPTCHA at a starting position according to a first embodiment. The CAPTCHA, generated in response to an access attempt, provides the illustrated image 100A. The CAPTCHA includes a path 110, a target 120, and an object 130. It is a user's task to move the object 130, in this case, a circle, but this should not be viewed as limiting the scope of the disclosed embodiments, from its starting point at the left of the path 110 all the way past the target 120, and positioning the object 130 at position 135 or thereabout. As the user moves the object 130 with respect to the path 110 and passed the target 120, various parameters respective of the motion of the object 130 are captured and processed as further explained herein.

Figure 1B:
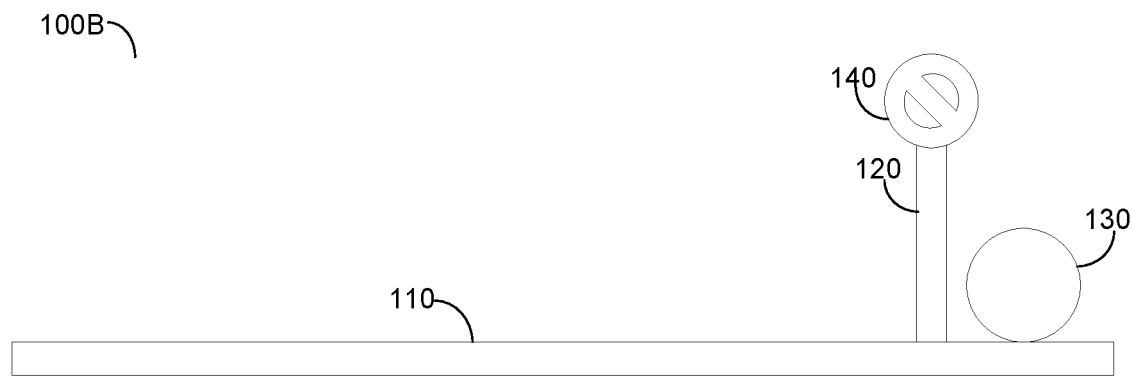
FIG. 1B is an illustration of a failed CAPTCHA at an end position according to the first embodiment.

FIG. 1B is an illustration 100B of a failed CAPTCHA at an end position according to the first embodiment. The object 130 was moved by the user all of the path 110 and passed the target 120. During this pass various parameters, respective of this motion are captured and processed as described herein in further detail. In this case, it was determined, and as further explained herein, that the user has failed the CAPTCHA process, and therefore the NO SIGN 140 is displayed. At this time, the user may opt for another CAPTCHA attempt, if such is afforded, or otherwise, access is denied.

Figure 1C:
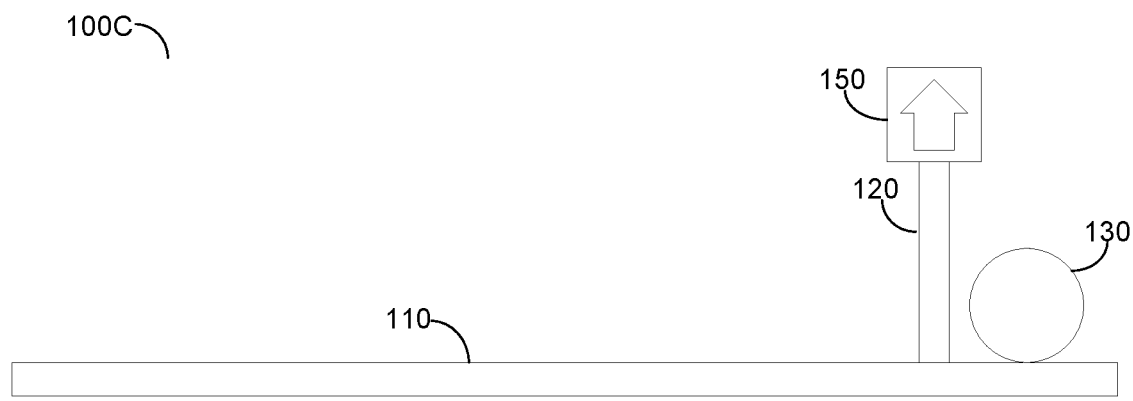
FIG. 1C is an illustration of a successful CAPTCHA at an end position according to the first embodiment.

FIG. 1C is an illustration 100C of a successful CAPTCHA at an end position according to the first embodiment. The object 130 was moved by the user all of the path 110 and passed the target 120. During this pass parameters respective of this motion are captured and processed as described herein in further detail. In this case, it was determined, and as further explained herein, that the user had a successful attempt at the CAPTCHA process, and therefore the PASS SIGN 150 is displayed. Thereafter, the user gains access, for example, but not by way of limitation, to the website, computer program, interactive device, or interactive application, as the case may be.

Figure 2A:
FIG. 2A is an illustration of a CAPTCHA at a starting position according to a second embodiment.

FIG. 2A is an example illustration 200A of a CAPTCHA at a starting position according to a second embodiment. The CAPTCHA in response to an access attempt provides the illustrated image 200A. In an embodiment, this may be a CAPTCHA provided in the case where a failed CAPTCHA attempt has occurred, or if a provider wishes a more complex path for the user to correspond to.

In this example embodiment, the CAPTCHA includes a path 210, that further includes steps 211, 212 and 213, a target 220 and an object 230. It is a user's task to move the object 230, in this case an image of a person, but this should not be viewed as limiting the scope of the disclosed embodiments, from its starting point at the left of the path 210, all the way passed the target 220, and positioning the object 230 at position 235 or thereabout. As the user moves the object 230 with respect to the path 210, and over the steps 211, 212 and 213, and all the way passed the target 220, various parameters respective of the motion of the object 230 are captured and processed as further explained herein.

Figure 2B:
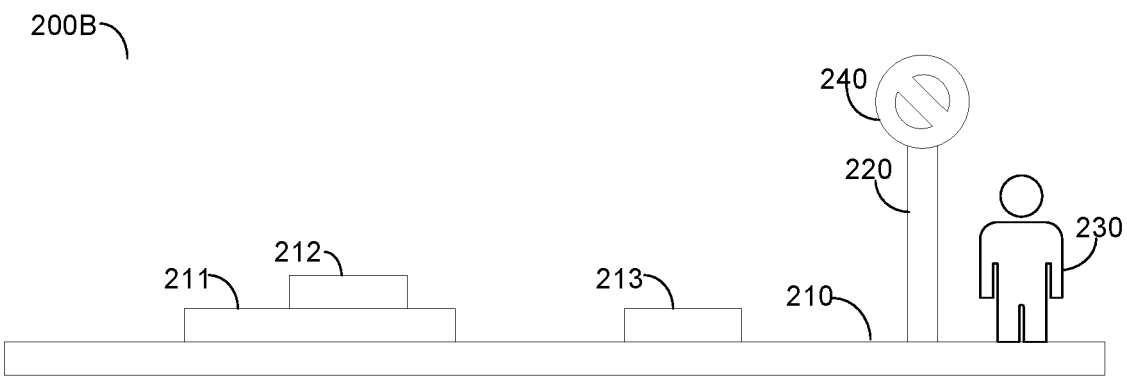
FIG. 2B is an illustration of a failed CAPTCHA at an end position according to the second embodiment.

FIG. 2B is an illustration 200B of a failed CAPTCHA at an end position according to the second embodiment. The object 230 was moved by the user all the way on path 210 and over the steps 211, 212, and 213, and then passed the target 220. During this pass parameters, respective of this motion are captured and processed as described herein in further detail. In this case, it was determined, and as further explained herein, that the user has failed the CAPTCHA process and therefore the NO SIGN 240 is displayed. At this time, the user may opt for another CAPTCHA attempt, if such is afforded, or otherwise, access is denied.

Figure 2C:
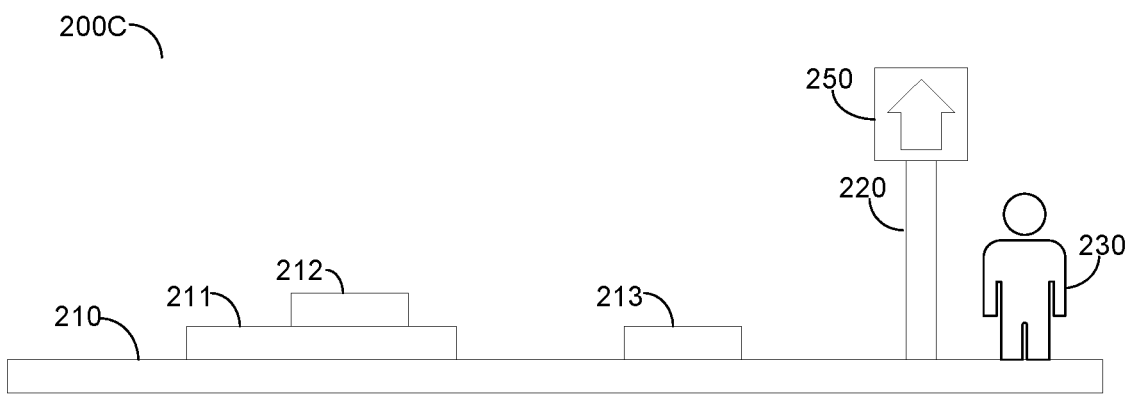
FIG. 2C is an illustration of a successful CAPTCHA at an end position according to the second embodiment.

FIG. 2C is an illustration 200C of a successful CAPTCHA at an end position according to the second embodiment. The object 230 was moved by the user all the way 210 and over the steps 211, 212 and 213, passing the target 220. During this pass parameters, respective of this motion are captured and processed as described herein in further detail. In this case, it was determined, and as further explained herein, that the user had a successful attempt at the CAPTCHA process, and therefore the PASS SIGN 250 is displayed. Thereafter, the user gains access, for example, but not by way of limitation, to the website, computer program, interactive device, or interactive application, as the case may be.

Figure 3:
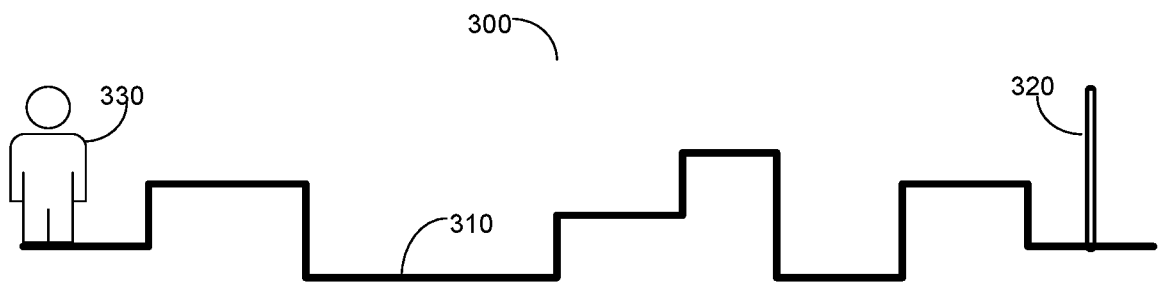
FIG. 3 is an illustration of a CAPTCHA at a starting position according to a third embodiment.

FIG. 3 is an example illustration 300 of a CAPTCHA at a starting position according to a third embodiment. In this case, a more complicated path 310 having ups and downs, i.e., vertical changes of the path 310, from the start point where the object 330 is positioned to post the target 320. The object 330, shown herein as a person (an illustrated character in a more general sense), should not be viewed as limiting the scope of the disclosed embodiments, including other embodiments discussed herein, and other objects may be used. These may include but are not limited to, animals, fruits, geometrical shapes, 3D shapes and more. While changes in levels are shown as jumps from one level to another, i.e., vertical change, this should not be viewed as limiting upon the scope of the disclosed embodiments. Slopes may be used to move from one level to another. Like in the previous embodiments, the user is challenged to move the object 330, following the path 310 and crossing the target 320. During this pass-over path 310 parameters, respective of this motion, are captured and processed as described herein in further detail. Passing will result in a PASS SIGN over the target as previously shown herein, and failure will result with a STOP SIGN, as previously shown herein.

Figure 4:
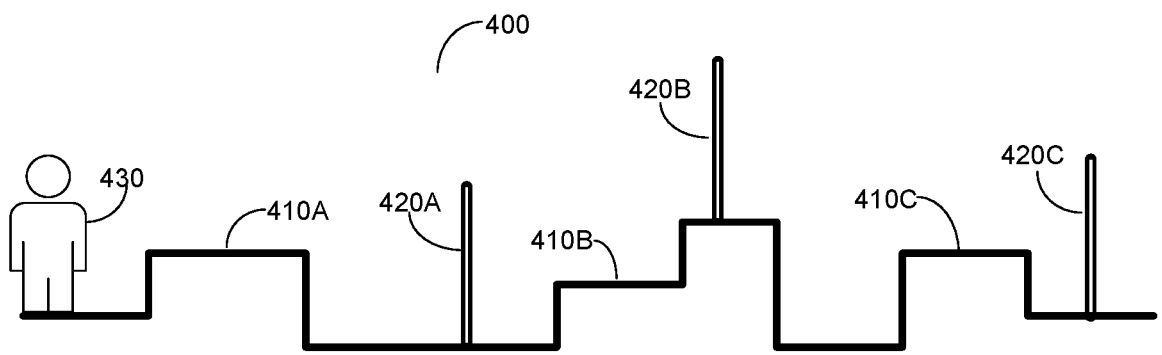
FIG. 4 is an illustration of a CAPTCHA at a starting position according to a fourth embodiment.

FIG. 4 is an example illustration 400 of a CAPTCHA at a starting position according to a fourth embodiment. In this case the path 310 shown in FIG. 3 is divided in sections 410A, 4106 and 410C, each having ups and downs. Section 410A extends from the start point where the object 430 is positioned to a target 420A. Thereafter, begins section 410B that extends until target 420B. Thereafter begins section 410C which extends to the last target 420C.

The object 430, shown herein as a person which should not be viewed as limiting the scope of the disclosed embodiments, and other objects may be used. These may include, but are not limited to, animals, fruits, geometrical shapes, 3D shapes and more. The challenge, in this case, requires the user to pass each section successfully, that is sections 410A, that the user can pass or fail, section 4106 that the user can pass or fail, and section 410C which the user can pass or fail. Passing will result in a PASS SIGN over the target as previously shown herein, and failure will result with a STOP SIGN, as previously shown herein.

It should be noted that while changes in levels are shown as jumps from one level to another, i.e., vertical change, this should not be viewed as limiting the various embodiments disclosed herein. Further, slopes may be used, i.e., inclines or declines, to move from one level to another without departing from the scope of the disclosed embodiments. Like in the previous embodiments, the user is challenged to move the object 430 following the path section 410A, 410B, and 410C, and crossing each of the corresponding targets 420A, 420B and 420C. During the pass over the sections 410A, 410B, and 410C, parameters respective of this motion are captured and processed as described herein in further detail.

Figure 5:
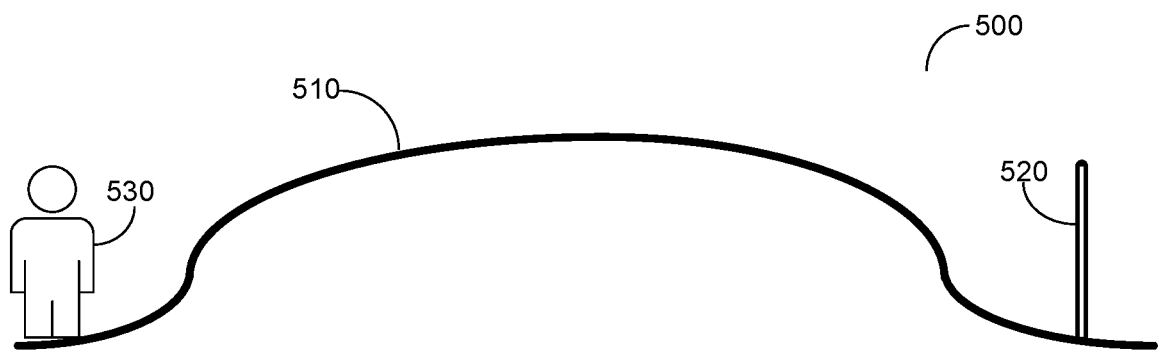
FIG. 5 is an illustration of a CAPTCHA at a starting position according to a fifth embodiment.

FIG. 5 is an example illustration 500 of a CAPTCHA at a starting position according to a fifth embodiment. In this case, curved path 510 extends from the start point where the object 530 is positioned to post the target 520. Like in the previous embodiments, the user is challenged to move the object 530 following the curved path 510 and crossing the target 520. During this pass-over path 510 parameters, respective of this motion, are captured and processed as described herein in further detail. Passing will result in a PASS SIGN over the target 520 as previously shown herein, and failure will result in a STOP SIGN, as previously shown herein.

Other embodiments may be combinations of various aspects of the paths shown in FIGS. 1-5. That is, a combination of horizontal paths, vertical steps, inclines, declines, curves of a variety of types, and the like, may be used in any permissible combination. For example, a path for an object may begin with an incline of a predetermined angle, then a horizontal section, then a step up, then a vertical step down, followed by a decline at another predetermined angle, after which a section is again horizontal before curving upwards. The CAPTCHA method, disclosed herein, may generate any permissible path and place throughout this permissible path one or more targets, the last of which is the final target. A permissible path has at least one section of one of a horizontal path, an incline, a decline, a curves of a variety of types, and the like.

A path may include one or more targets. At each target, a PASS or FAIL may be determined, as further described herein, and correspondingly place over a target a GO SIGN or STOP SIGN, as the case may be. In some embodiments a failure of an entire path from start to end requires that all target between the start point and the end-point are passed successfully. In another embodiment passing a number of targets above of a predetermined threshold is required, however not all targets need to be passed successfully. In some embodiments repeating a failed section is provided for in other embodiments, repeat all sections until the failed section is required. In yet other embodiments, upon failure, access is immediately denied.

Figure 6:
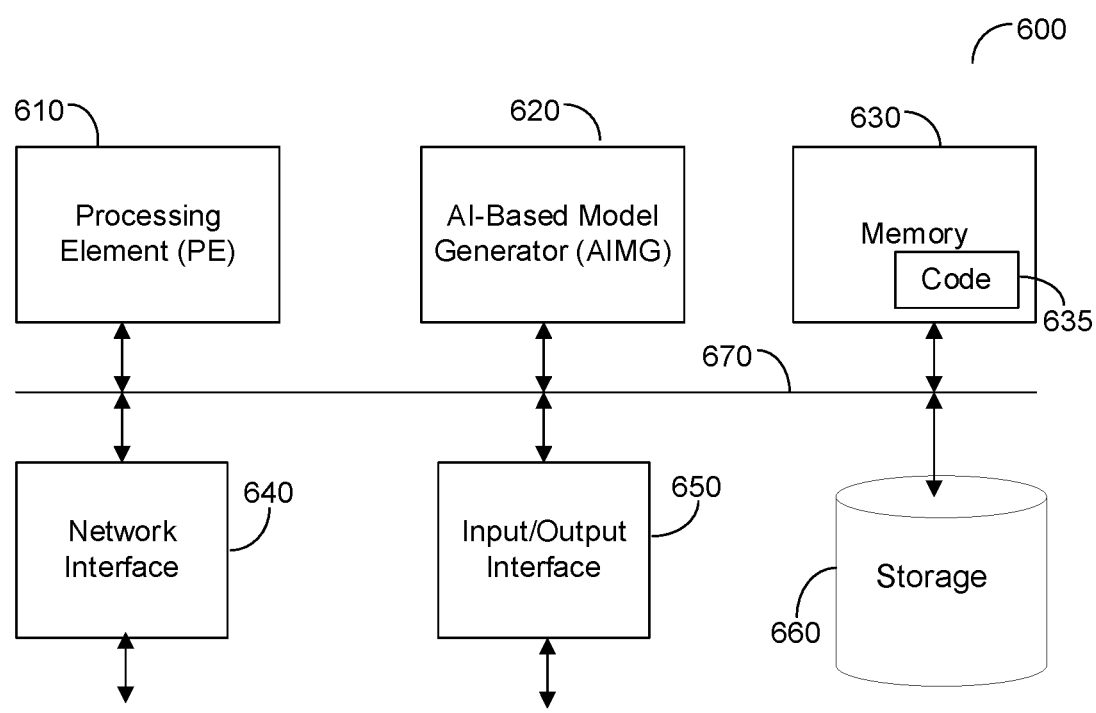
FIG. 6 is a CAPTCHA server according to an embodiment.

FIG. 6 is an example of CAPTCHA server 600 according to an embodiment. A processing element (PE) or circuitry 610, connected, for example, by bus 670, to a memory 630. The memory 630 includes both volatile memory, such as random-access memory (RAM), and like volatile memory, and non-volatile memory, such as read-only memory (ROM), Flash memory, and other like memory types, all in any desirable and applicable configuration. A portion of the memory 630 is devoted to being a code memory 635 that contains therein instructions that, when executed by the PE 610, configure the CAPTCHA server 600 to perform as described herein in greater detail. The code in code memory 635, may, for example, configure the CAPTCHA server 600 to generate a path, such as but not limited to the paths described in FIGS. 1-5, and associated target or targets, as well as an object to be moved successfully by a user over the path all the way to the target or targets, as the case may be. The code may be further configured the CAPTCHA server 600 to generate PASS or FAIL signs at the targets.

The processing element 610 may be realized as one or more hardware logic components and circuits. For example, and without limitation, illustrative types of hardware logic components that can be used include field-programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

A network interface 640, communicatively connected to the PE 610 by bus 670, provides network communication, wired or wireless or combinations thereof, as well as different communication protocols and standards. This enables the CAPTCHA server 600 to communicate from the CAPTCHA server 600 and to the CAPTCHA server 600 as may be necessary and as further described herein. Optional units may include an AI-Based model generator (AIMG) 620 communicatively connected to the PE by bus 670. The AIMG 620 may be used to generate AI models, using supervised or unsupervised learning techniques, as the case may be, to allow for identification of PASS or FAIL of a particular pass over a path as further described herein. The AIMG 620 operation may be under the control of code from memory code 635 executed by the PE 610. The AIMG 620 may be trained to: a) generate permissible paths as described herein; and/or b) compare performance of a pass over a path and determine PASS or FAIL status for each pass.

In one embodiment, AIMG 620 is implemented as code stored in code memory 635 which is executed by the PE 610 to get the results of the AIMG 620. In another embodiment a rule-based solution is used instead of the AI-based model generation. In yet another embodiment a combination of AIMG 620 and a rule-based engine is used, all without departing from the scope of the disclosed embodiments. The AIMG 620 may be further realized as one or more hardware logic components and circuits, examples of which are provided herein.

The CAPTCHA server 600 may further comprise and input/output (IO) interface 650 communicatively connected by bus 670 to the PE 610. The IO interface 650 may allow for connection to peripherals like a keyboard (not shown), mouse (not shown), display (not shown), and other common peripherals. In an embodiment a storage 660 may further be communicatively connected to the PE by the bus 670, though in other embodiments such a storage 660 may be connected to the network interface 640 as an external device, and without departing from the scope of the disclosed embodiment. The storage 660 may contain therein code that is loaded to the code memory 635 on an as needed basis, data that is either loaded to the memory 630 or downloaded to the DB 660 as may be necessary to perform the tasks described herein. In an embodiment, models generated by the AIMG 620 are stored for future use in the storage 660.

Figure 7:
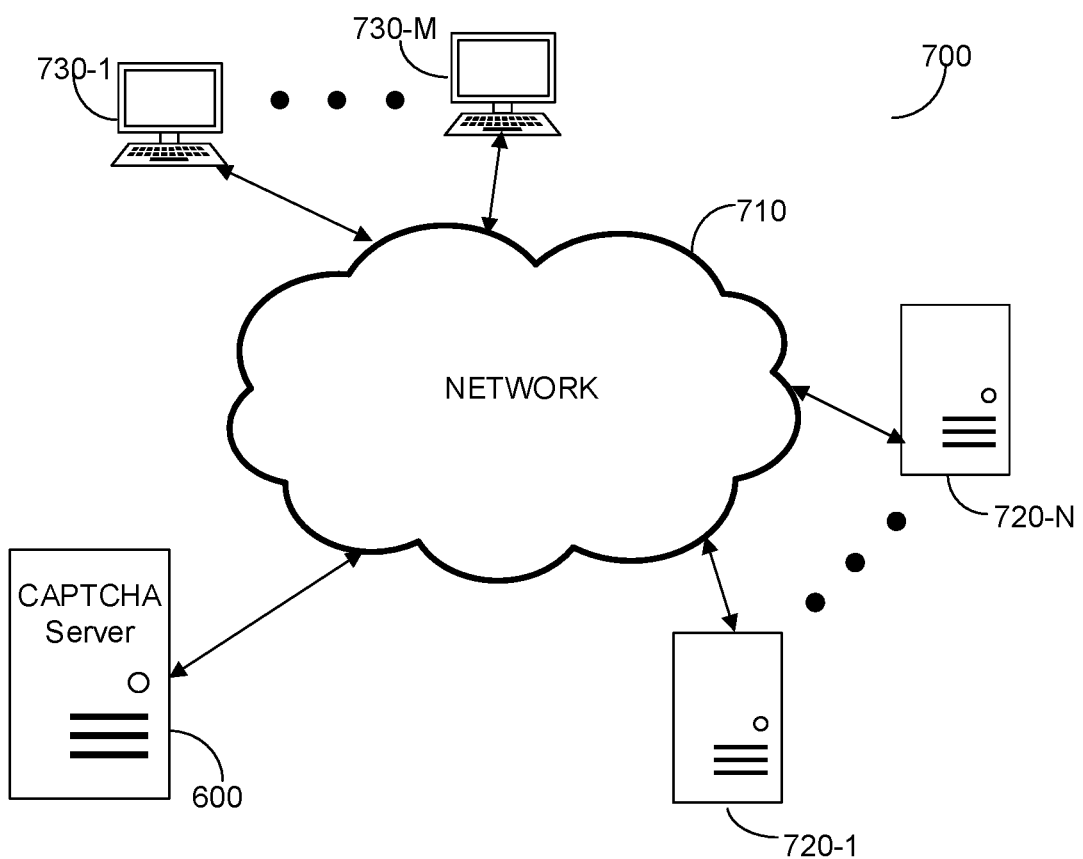
FIG. 7 is a networked system configured with the CAPTCHA server according to an embodiment.

FIG. 7 is a networked system 700 configured with the CAPTCHA server 600 according to an embodiment. The CAPTCHA server 600 is communicatively connected to the network 710. The network 710 is a communication network that may comprise of a wired and/or wireless network and any combinations thereof. The networks may be the like of, but not limited to, local area network (LAN), wide area network (WAN), metro area network (MAN), the Ethernet, the worldwide web (VVWW), the Internet, cellular, WiFi®, Bluetooth®, and many other standard and non-standard data communication networks and/or protocols. One or more user nodes 720, for example, user nodes 720-1 through 720-N, where N is an integer equal to or greater than '1', are communicatively connected to the network 710. Furthermore, to the network 710, there are communicatively connected one or more service nodes 730, for example service nodes 730-1 through 730-M, where M is an integer equal to or greater than '1'. The service servers 730 may represent a wide variety of types of services, such as web pages, applications, and other services accessible of the network 710.

A user node 710, for example user node 720-1, may wish to communicatively connect to a service server 730, for example service server 730-1. The service server 730-1 wishes to verify that the user node 720-1 is operated by a human rather than being a bot, and therefore redirects the request to the CAPTCHA server 600.

According to the disclosed embodiments, the CAPTCHA server 600 is configured to send to the user node 720-1 a CAPTCHA that includes an object, a path, a target and instructions to move the object over the path towards the target and complete at the other side of the target, as was shown in respective examples of FIGS. 1-5. As the user attempts to perform the challenge received from the CAPTCHA server 600, various parameters are gathered from a list of possible parameters so that it becomes possible to evaluate the performance of a pass over the path and determine if that was performed by a human or a bot.

The following is an exemplary list of Java Script® attributes and/or events, and their corresponding description. It should be understood that not all the attributes listed are collected as parameters for the process of distinguishing between a human operating the user node 720-1 and a bot operating same. Furthermore, embodiments using other attributes as its parameters are also possible and any combinations thereof.

Offline—Triggers when the document goes offline. Onabort—Triggers on an abort event. Onafterprint—Triggers after the document is printed. Onbeforeunload—Triggers before the document loads. Onbeforeprint—Triggers before the document is printed. Onblur—Triggers when the window loses focus. Onchange—Triggers when an element changes. Onclick—Triggers on a mouse click. Ondblclick—Triggers on a mouse double-click. Ondrag—Triggers when an element is dragged. Ondragend—Triggers at the end of a drag operation. Ondragenter—Triggers when an element has been dragged to a valid drop target. Ondragleave—Triggers when an element is being dragged over a valid drop target. Ondragover—Triggers at the start of a drag operation. Ondragstart—Triggers at the start of a drag operation. Ondrop—Triggers when dragged element is being dropped. Onerror—Triggers when an error occurs. Onfocus—Triggers when the window gets focus. Onhaschange—Triggers when the document has change. Oninput—Triggers when an element gets user input. Oninvalid—Triggers when an element is invalid. Onkeydown—Triggers when a key is pressed. Onkeypress—Triggers when a key is pressed and released. Onkeyup—Triggers when a key is released. Onload—Triggers when the document loads. Onmousedown—Triggers when a mouse button is pressed. Onmousemove—Triggers when the mouse pointer moves. Onmouseout—Triggers when the mouse pointer moves out of an element. Onmouseover—Triggers when the mouse pointer moves over an element. Onmouseup—Triggers when a mouse button is released. Onmousewheel—Triggers when the mouse wheel is being rotated. Onoffline—Triggers when the document goes offline. Ononline—Triggers when the document comes online. Onpagehide—Triggers when the window is hidden. Onpageshow—Triggers when the window becomes visible. Onpopstate—Triggers when the window's history changes. Onreadystatechange—Triggers when the ready-state changes. Onredo—Triggers when the document performs a redo. Onresize—Triggers when the window is resized. Onscroll—Triggers when an element's scrollbar is being scrolled. Onselect—Triggers when an element is selected. Onstorage—Triggers when a document loads. Onsuspend—Triggers when the browser has been fetching media data, but stopped before the entire media file was fetched. Onundo—Triggers when a document performs an undo. Onunload—Triggers when the user leaves the document.

Returning to FIG. 7, upon collection of the data for a plurality of parameters determined relevant for the purpose of differentiating a human user from a bot user of user node 720-1, this gather data is send to the CAPTCHA server 600 for processing. The processing may be rule-based or, by using the AIGM 620 of the CAPTCHA server 600 to determine whether the vector associated with the pass performed over the path by the user node 720-1 conforms with expectation from a human. If determined to be so, then the PASS indication may be provided. If the pass over the path is identified to conform with a bot rather than a human, then a FAIL indication may be provided.

In yet another case, an inconclusive situation may be identified, for example a probability that is at or about the 50:50 mark, for example, at a predetermined range thereof, for example, plus/minus 10 percent points. In such a case, depending on the preference of the operator of the service server 730-1, the CAPTCHA server 600 may either deny access or, provide another path or a retry over the same path.

According to an embodiment, a machine learning model is trained (e.g., by training the AIGM 620, FIG. 6) prior to releasing the model for use. In such a case, a dataset containing both valid transactions, i.e., those performed by humans, as well as transactions initiated by bots, are provided as a training set. After a training period, the model may be tested using a test dataset to determine whether a predetermined level of accuracy has been reached, for example in at least one of, or both of false negative (FN) and false positive (FP) as the case may require. Similarly, such tests can be run on a system that operates using rule-based determination whether a human user or a both is operating a user node 720. The parameters used are based, for example, on the attributes defined as relevant for the determination of differentiation between a human and a bot operating a user node 720.

Figure 8:
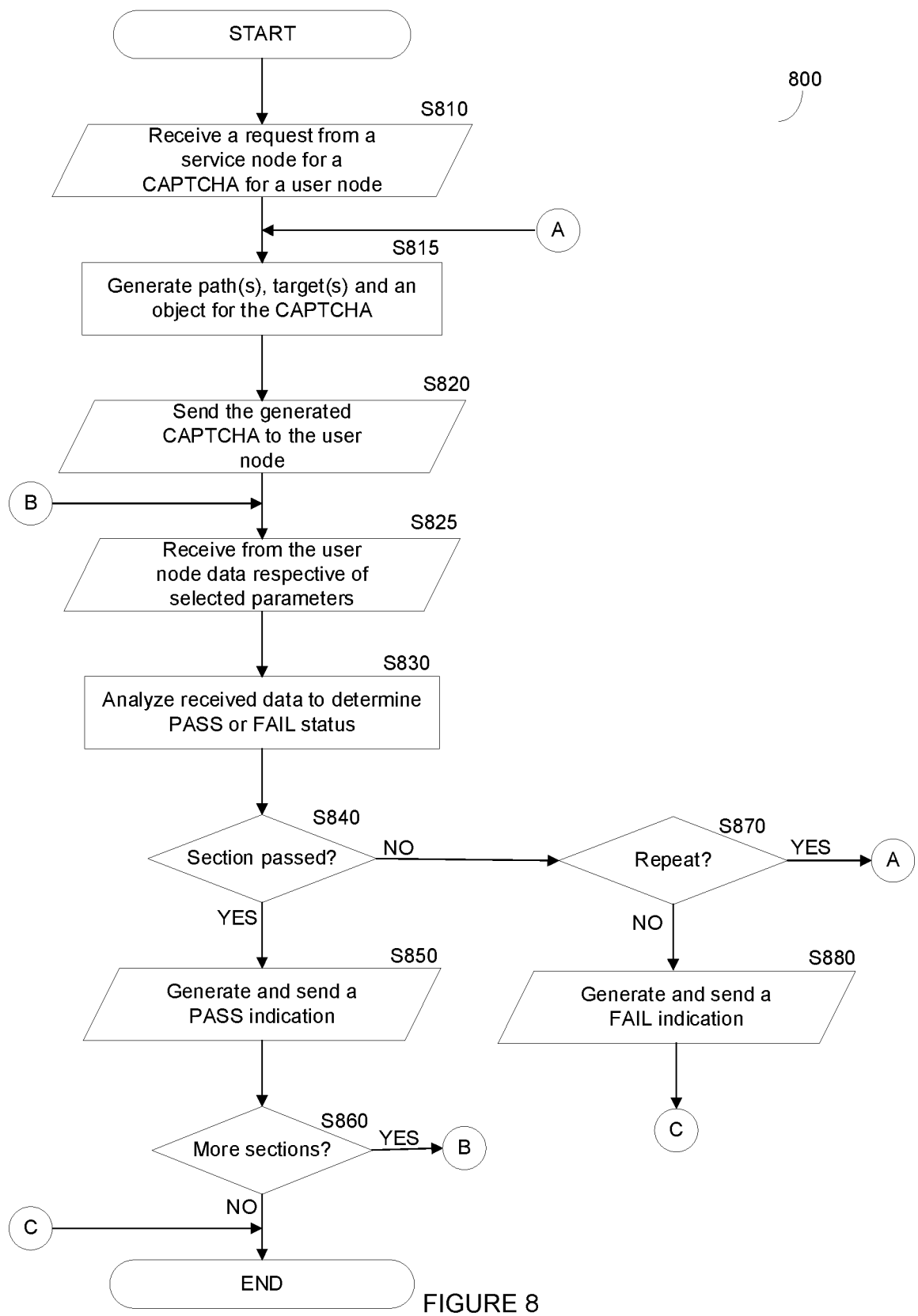
FIG. 8 is a flowchart describing a method for providing interactive image-based captcha challenge according to an embodiment.

FIG. 8 is an example flowchart 800 a method for providing interactive image-based captcha challenge according to an embodiment. The method may be performed by a server, such as the CAPTCHA server 600, FIG. 6.

At S810, a request is received from a service node for providing a user node with an interactive CAPTCHA such as those discussed in FIG. 8. For example, the server 600 (FIG. 6) can receive a request from a service node 730, for example, service node 730-1, for sending a CAPTCHA to a user node 720, for example user node 720-1. This may be in response to a user node 720-1 attempt to access the service node 730-1, and the configuration of service node 730-1 to perform a CAPTCHA verification of the user node 720-1.

At S815, one or more paths, one or more targets, and an object are generated. Examples for such paths, targets and objects are discussed in exemplary but non-limiting FIGS. 1-5 and respective descriptions. The generation of a particular path may be a function of a desired complexity of a challenge. For example, a simple CAPTCHA challenge may involve a single horizontal path and a single target, while a complex CAPTCHA may involve a path having a combination of horizontal, vertical, curved, incline and decline sections, as well as a plurality of targets, each having to be successfully passed. Many other combinations are possible where all or some of the possible path characteristics are present.

At S820, the generated interactive CAPTCHA is sent to the user node, for example user node. The sending of the CAPTCHA involves, for example, but not by way of limitation, sending a script, for example a Java® Script, to be executed by the user node that causes the display of the path, the target(s) and the object. Furthermore, the script is configured to send back to the CAPTCHA server data regarding the parameters selected to be captured for the purpose of performing the recognition of a human or bot operative of the user node 720-1.

At S825, data respective of selected parameters is received from the user node. The parameters are based, for example, on the attributes discussed herein for the case of Java® Script attributes. However, other data associated with additional or different parameters may be provided depending on the specific implementation. The parameters checked provide information regarding the motion of the object over the path and passed the targets.

At S830, the data collected is used for the purpose of determining the status, PASS or FAIL of the passage of the object over the designated path for the user node. This may be performed by, for example, but not by way of limitation, AIMG, where a vector representing the data collected is provided to a detection model trained by the AIMG so that based on the provided data a distinction between data received from the passage of a human and a bot over the designated path is positively determined, or otherwise with as low as determined FP and FN. In another embodiment this determination is rule-based, i.e., a series of predetermined rules is used to determine if the data should be classified as a PASS or FAIL for the section being checked.

At S840, it is checked whether additional sections of the path need to be checked. If it is determined that additional sections need to be checked, then execution continues with S850. Otherwise, execution continues with S870.

At S850, a PASS indication is generated and then sent to at least the user node and potentially to the service node, and as further explained herein. Following the above example, a PASS indication is sent to at least the user node 720-1 and potentially to the service node 730-1. In an embodiment, where multiple targets are to be successfully crossed then the service node receives the PASS indication only once all previous targets have been determined to have a PASS indication. The CAPTCHA script sent to the user node will show a PASS symbol indicating that the target has been successfully achieved. In another embodiment, where from a plurality of targets at least a number of targets above a particular threshold may be required to consider successful pass over the path. Furthermore, there may also be a requirement that the final target must successfully pass.

At S860, it is checked whether there are more sections of a path to be processed. That is, if there are multiple targets then the path is divided into section, as further discussed herein, and each section is checked separately for a PASS or FAIL indication. If more sections are to be checked, then execution continues with S825. Otherwise, execution terminates.

At S870, the case of a FAIL determination is taken care of. At S880, it is checked whether a repeat is permissible for the case. This may be a determination of the service node which may allow unlimited repeats until success, a limited number of repeats, potentially within a limited predetermined time period, or simply denying access immediately. Hence, if a repeat is allowed execution continues with S815. Otherwise, execution continues with S880.

At S880, a FAIL indication is generated and then sent to the user node and to the service node. The CAPTCHA script will display at the user node a FAIL sign. The service node will typically decline service to the user node. Following the above example, a FAIL indication is sent to the user node 720-1 and to the service node 730-1.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether such a computer or processor is explicitly shown or not. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for performing a completely automated public Turing test to tell computers and humans apart (CAPTCHA), comprising:
   receiving by a server a request from a service server to initiate a CAPTCHA of a user node;
   generating, by the server, an image of a path;
   generating, by the server, at least one target to be placed upon the path in the image;
   generating, by the server, an object to be placed at a start point of the path in the image;
   sending the generated image of the path, the at least one generated target, and the object as a CAPTCHA challenge to the user node for display thereon;
   receiving, by the server, data based on motion of the object with respect to the path and the at least one generated target; and
   issuing, based on analysis of the received data, a pass indication upon determination that the user node is operative by a human.

2. The method of claim 1, wherein issuing the pass indication occurs upon determination that a predetermined number of successful pass over a target have occurred.

3. The method of claim 1, further comprising:
   issuing, based on analysis of the received data, a fail indication upon determination that the user node is operative by a bot.

4. The method of claim 3, wherein issuing the fail indication occurs upon determination that at least one pass over a target has failed.

5. The method of claim 3, further comprising:
   prior to sending a fail indication, checking whether it is permissible to repeat a CAPTCHA challenge; and
   when it is permissible to repeat a CAPTCHA challenge, re-generating an image of a path.

6. The method of claim 3, further comprising:
   sending the user node a fail indication.

7. The method of claim 3, further comprising:
   sending the service server a fail indication.

8. The method of claim 1, wherein the service server is at least one of: a website, a computer program, an interactive device, and an interactive application.

9. The method of claim 1, wherein the image of the path comprises at least one of: a horizontal section, a vertical section, an inclines section, a declined section, and a curved section.

10. The method of claim 1, wherein the object is one of: a two-dimensional image, and a three-dimensional image.

11. The method of claim 1, wherein the object is one of: a geometric shape and an illustrated character.

12. The method of claim 1, wherein the analysis of the received data further comprises:
    analyzing the received data based on motion of the object with respect to the path and the at least one target.

13. The method of claim 1, wherein the analysis of the received data further comprises: applying a predetermined rule-based analysis.

14. The method of claim 1, wherein the analysis of the received data further comprises: analyzing the data using a machine learning model.

15. The method of claim 14, further comprising:
    training the machine learning model using a training dataset, wherein the dataset enables detection of differences between a human interaction with the CAPTCHA challenge and a computer interaction with the CAPTCHA challenge.

16. A non-transitory computer readable medium having stored thereon instructions for causing a processing circuitry to execute a process for performing a completely automated public Turing test to tell computers and humans apart (CAPTCHA), the processing comprising:
    receiving by a server a request from a service server to initiate a CAPTCHA of a user node;
    generating, by the server, an image of a path;
    generating, by the server, at least one target to be placed upon the path in the image;
    generating, by the server, an object to be placed at a start point of the path in the image;
    sending the generated image of the path, the at least one generated target, and the object as a CAPTCHA challenge to the user node for display thereon;
    receiving, by the server, data based on motion of the object with respect to the path and the at least one generated target; and issuing, based on analysis of the received data, a pass indication upon determination that the user node is operative by a human.

17. A system for performing a completely automated public Turing test to tell computers and humans apart (CAPTCHA), comprising:
a processing circuitry; and
a memory, the memory containing instructions that, when executed by the processing circuitry, configure the system for:
receive by a server a request from a service server to initiate a CAPTCHA of a user node;
generate, by the server, an image of a path;
generate, by the server, at least one target to be placed upon the path in the image;
generate, by the server, an object to be placed at a start point of the path in the image;
send the generated image of the path, the at least one generated target, and the object as a CAPTCHA challenge to the user node for display thereon;
receive, by the server, data based on motion of the object with respect to the path and the at least one generated target; and
issue, based on analysis of the received data, a pass indication upon determination that the user node is operative by a human.

18. The system of claim 17, wherein the system is further configured to:
issue the pass indication occurs upon determination that a predetermined number of successful pass over a target have occurred.

19. The system of claim 17, wherein the system is further configured to:
issue, based on analysis of the data received, a fail indication upon determination that the user node is operative by a bot.

20. The system of claim 19, wherein the system is further configured to:
issue the fail indication occurs upon determination that at least one pass over a target has failed.

* * * * *